Jan. 31, 1939.  A. STRACHE ET AL  2,145,325
TUNING CONTROL DEVICE
Filed March 11, 1937
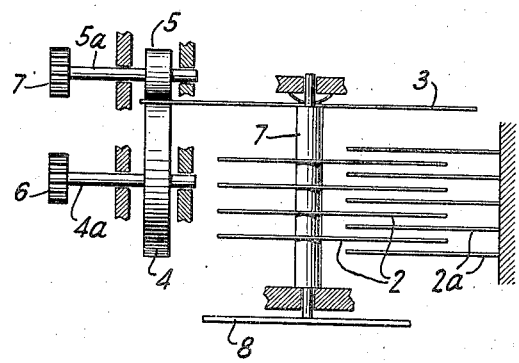
INVENTORS
ARTHUR STRACHE AND
WILLI KLAWUN
BY
ATTORNEY Patented Jan. 31, 1939

2,145,325

UNITED STATES PATENT OFFICE 2,145,325

TUNING CONTROL DEVICE

Arthur Strache and Willi Klawun, Berlin, Germany, assignors to Allgemeine Elektricitatz Gesellschaft, Berlin, Germany Application March 11, 1937, Serial No. 130,224
In Germany March 27, 1936

3 Claims. (Cl. 74—10)

In calibrated rotary condensers, variometers and the like, it has been difficult to receive always the same electric value when adjusting to one and the same scale graduation, since the rotor of the apparatus was influenced with respect to its position to the stator by the pressure of the hand in an axial or radial direction.

In accordance with our invention this shifting of the rotor is prevented in the manner that a flexible intermediate member is inserted between the driving element and the axis of the rotor. The fine and coarse adjustment can in this case be effected, although it is advantageous according to a further novel feature of the invention to use as a drive, friction wheels that engage the same point of the flexible intermediate element, for instance a membrane since thus the friction wheels of different diameter may be used directly without further intermediate members for the coarse and fine adjustment.

For a better understanding of the invention, reference is made to the accompanying drawing which shows an embodiment thereof as applied to a tuning condenser. To the shaft 1 of a rotary condenser having a set of rotor plates 2 which interleave with a set of stator plates 2a is secured a circular disc 3 of flexible material. The rim of this disc which acts as a membrane is engaged by two friction wheels 4 and 5 which bear on its opposite surfaces directly opposite each other. As shown, these wheels are of different sizes and are mounted on separate shafts 4a and 5a which have the control knobs or handles 6 and 7 for the manual operation thereof.

If a rough or coarse adjustment of the tuning condenser is desired, the knob 6 is rotated, whereby a large angle of adjustment of the condenser shaft is secured for a given angular adjustment of knob 6. If, however, a finer adjustment is then desired, the knob 7 is then rotated, a given angular adjustment of which will produce a smaller angular adjustment of shaft 1. The adjusted position of shaft 1 may be indicated on a graduated dial 8 secured thereto.

While we have shown the invention as embodied in a friction drive, it will be understood that other forms of drive may be provided without departing from the spirit of the invention herein disclosed and claimed.

Having described our invention what we claim as new and desire to secure by Letters Patent is:

1. Means for adjusting the rotary element of a radio tuning device comprising the combination of a substantially circular driven member connected to said rotary element, a pair of drive members of different diameters in engagement respectively with the opposite faces of said driven member and arranged to be movable in a common plane at right angles to the plane of the driven member, and separate manually-operable control members connected to rotate said drive members selectively.

2. Means for adjusting the rotor member of a tuning condenser comprising in combination, a flat disc connected to said rotor member and movable therewith, a friction gear engaging one surface of said disc in the region near its periphery, a second friction gear of different diameter than said first named gear engaging the other surface of said disc at a position directly opposite the point of engagement of said first gear, and separate manually-operable control means connected to rotate said friction gears selectively.

3. Control mechanism for the tuning element of radio apparatus comprising a pair of manually-operable members, one for making a coarse adjustment and the other for making a fine adjustment of the tuning element, a pair of friction driving wheels of different diameters arranged in a common plane and affixed to the respective manually-operable members, and a disc, affixed to the tuning element and rotatable therewith, in frictional engagement with the periphery of both said friction wheels and adapted to be driven thereby in response to manipulations of either of the manually-operable members.

ARTHUR STRACHE.
WILLI KLAWUN.